June 27, 1944.  H. V. WELLES  2,352,301
VEHICLE DRIVE
Filed July 28, 1943  4 Sheets-Sheet 1
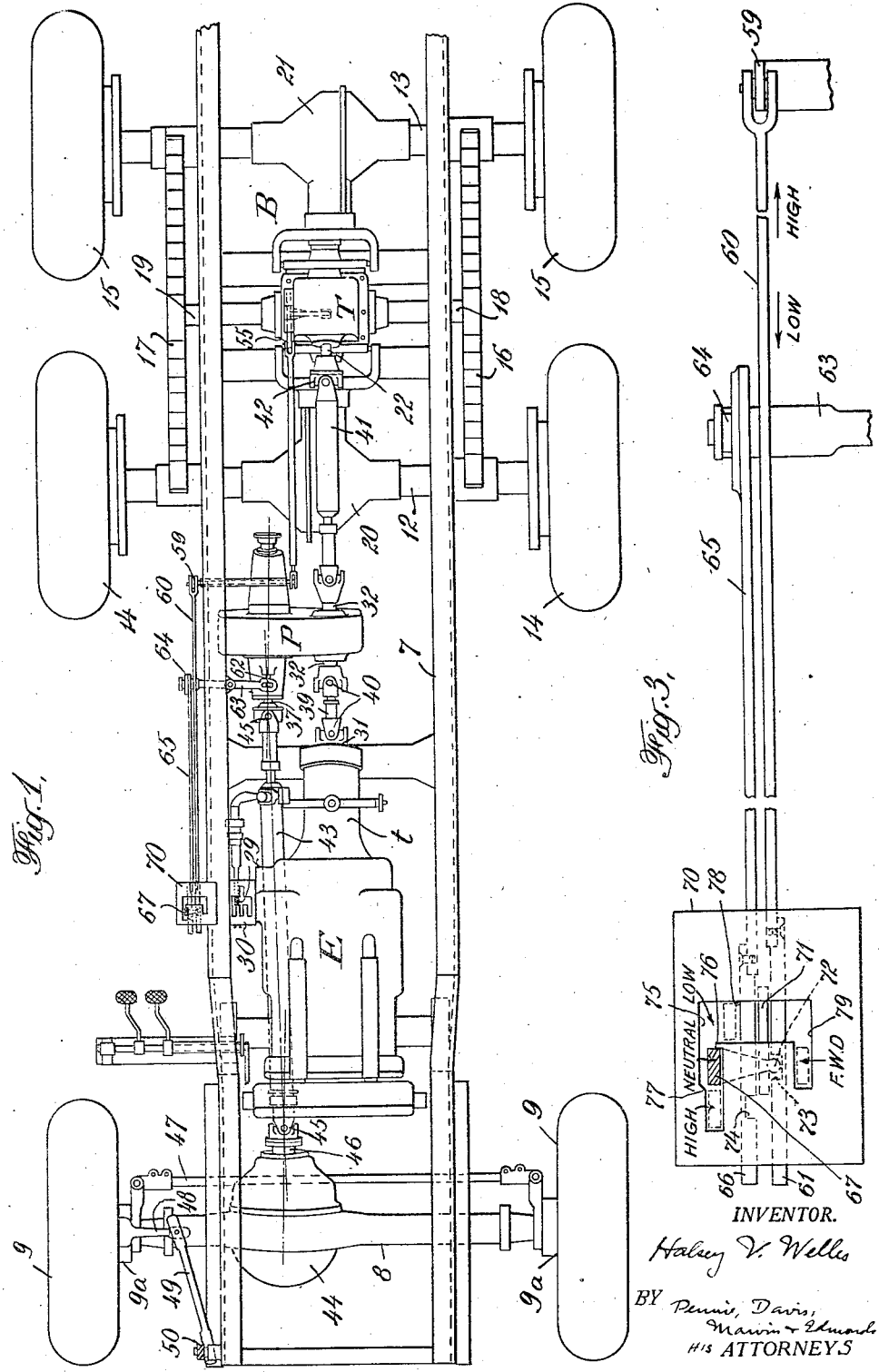
INVENTOR.
Halsey V. Welles
BY Pennie, Davis,
Marvin & Edmonds
HIS ATTORNEYS June 27, 1944.  H. V. WELLES  2,352,301
VEHICLE DRIVE
Filed July 28, 1943   4 Sheets-Sheet 2

INVENTOR.
Halsey V. Welles
BY
Pennie, Davis, Marvin & Edmonds
HIS ATTORNEYS

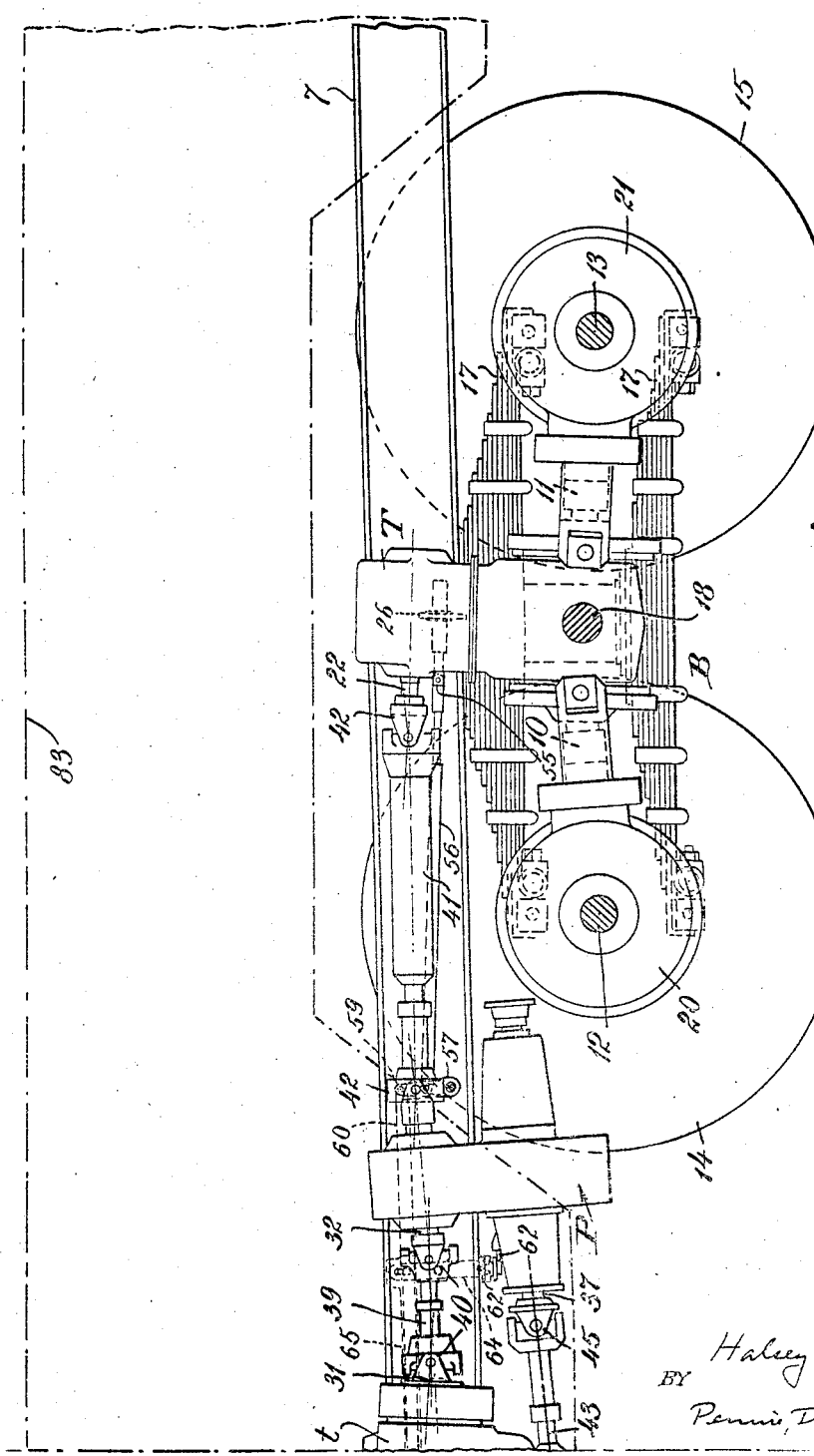

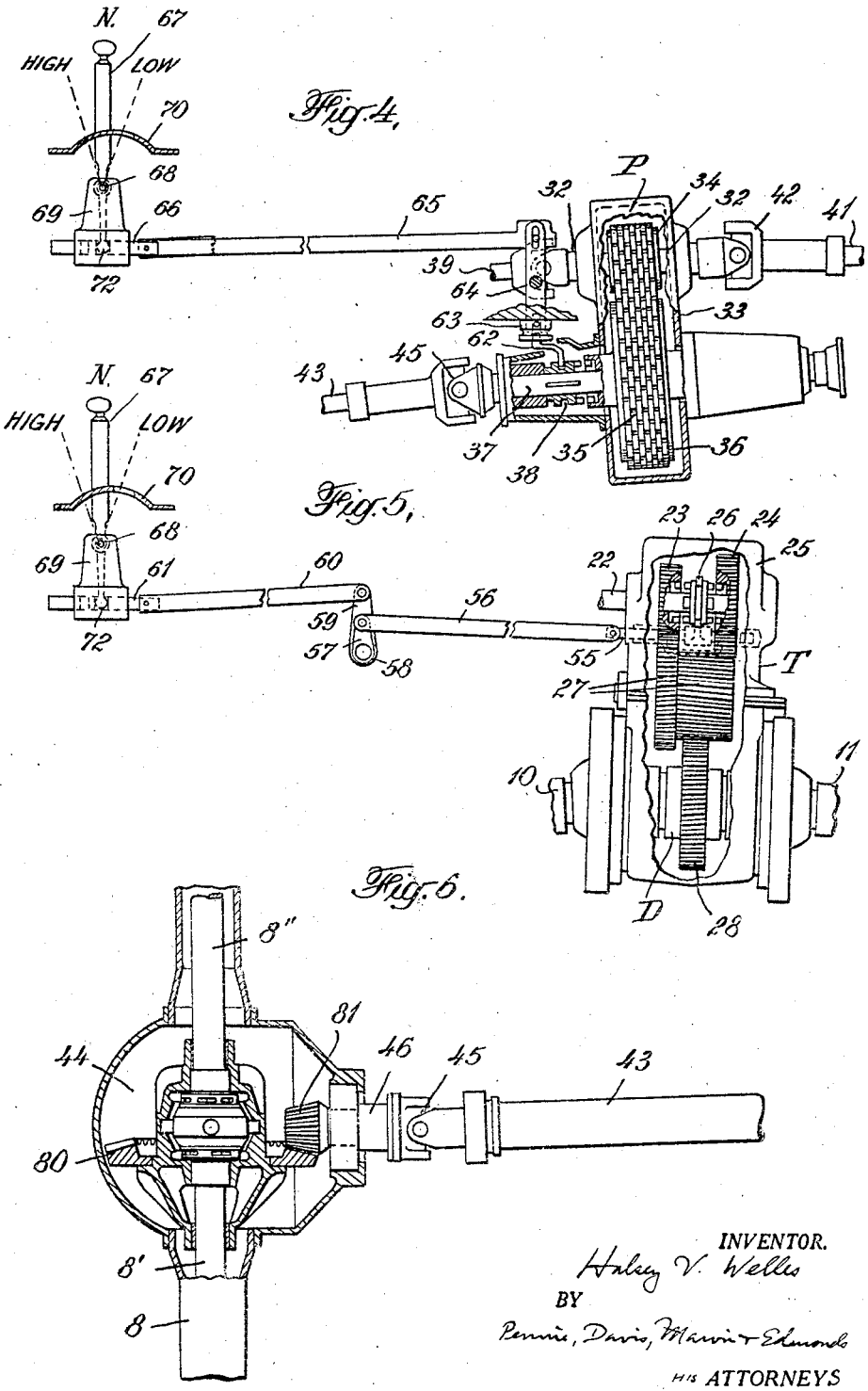

Patented June 27, 1944

2,352,301

UNITED STATES PATENT OFFICE 2,352,301

VEHICLE DRIVE

Halsey V. Welles, Detroit, Mich.

Application July 28, 1943, Serial No. 496,443

15 Claims. (Cl. 180—23)

This invention relates to driving mechanism for power operated vehicles of the multiple drive axle type, and more particularly concerns an improved combination for delivery driving power from the engine to all of the road-engaging wheels of the vehicle. While useful for general civilian application, the improved drive of the invention is particularly adapted to military applications.

A vehicle for use in combat and related military operations should combine a relatively short wheelbase with high tractive effort at minimum weight, short turning radius, easy maneuverability, low profile particularly at the front end and the ability to negotiate both rough terrain at relatively low speeds and smooth surfaced roads at relatively high speeds. In the past, certain of these features have been separately attained to a limited degree, but, so far as I am aware, no single design of vehicle has combined all of them to the degree desired by military authorities. High tractive effort has been attained in certain four wheel and six wheel drive vehicles, but only at the expense of high profile, high front end construction, excessive weight, long wheel base, inability to maintain both high speeds and maneuverability, excessive wear of driving parts, or combinations of two or more of these drawbacks.

In such prior vehicles, the engine is necessarily placed near one end thereof, usually the front end, to provide a considerable length of drive shaft between the sprung engine and the unsprung driving axle at the opposite or rear end of the chassis. In such vehicles, long drive shafts are needed to prevent undue wear on universal joints. In order to take off power for the front axle drive, it has been customary to provide a power divider on the driving connection between the engine and the rear axle drive shaft, and since this divider must be fixed to the vehicle frame, the length available for the rear end drive shaft is necessarily reduced. With such a construction, short wheelbase is attained only at the expense of moving the motor to the extreme front end of the frame which overloads the front axle, particularly where front end armor is used, and gives a high front profile that is obviously undesirable in a military vehicle for use in combat zones.

In certain known vehicles, increased tractive effort is secured by the use of gearless or self-locking differentials in the drive axles. These are axle drive devices that not only permit the usual speed differential between the wheels on the two axle halves, but also deliver driving power to both wheels of the driven pair regardless of the traction on such wheels. Thus, when one of the two wheels driven through a gearless or self-locking differential encounters a slippery surface or otherwise loses traction, both wheels continue to be driven at the same speed and the vehicle continues to exert tractive effort unless and until both wheels slip. Despite this tractive advantage, gearless differentials have not been widely used on dirigible front wheel drive axles because their characteristics make steering difficult or dangerous except at relatively low speeds. This is due to the fact that in rounding a turn, the outer wheel travels faster than the inner and so receives no driving power. Thus, all the driving power is delivered through the inner wheel which consequently tends to gain on the outer wheel, thereby setting up forces which tend to center the steering mechanism and so oppose the steering effort of the operator.

With the above and other considerations in mind, it is the object of the present invention to provide a vehicle drive which combines in a unitary structure all of the desirable features first enumerated above. More specifically, it is proposed in accordance with the present invention to provide a power operated vehicle in which all of the road-engaging wheels are positively driven, in which the engine may be set back from the front end of the vehicle to permit a low streamlined front aspect without increase in wheelbase or overloading the front axle, and in which gearless or self-locking differentials may be employed on all drive axles including a dirigible wheel front driving axle without loss of maneuverability or ease or safety of control.

The objects of the invention also include the provision of a vehicle drive of the type described in which power losses in the drive shafts are minimized by so arranging the various shaft elements that variable velocities in the universal joints cancel to produce a drive of uniform angular velocity. This also minimizes wear on the driving connections. Various other specific objects, advantages and characteristic features of the invention will be pointed out or will become apparent as the description of a preferred embodiment thereof progresses.

In general, the above and other objects of my invention are carried out by providing a vehicle having a multi-speed transmission spaced from the engine and standard transmission box and connected thereto by a main drive shaft. This transmission may comprise a part of a rear end drive assembly and in a preferred embodiment of the invention comprises the two speed transmission of the tandem rear end drive described in United States Patents Nos. 1,897,153 and 2,047,088 to Ray Thornton. A single speed power divider is connected to the main drive shaft between the engine and the above mentioned transmission and is disengageably connected to a drive axle at one end of the vehicle, preferably a dirigible wheel front drive axle. Suitable means such as those illustrated in the aforesaid Thornton patents are provided for connecting the output of the multi-speed transmission to one or more axles at the other or rear end of the vehicle, and a control is provided for shifting the multi-speed transmission and controlling the application of power to the front drive axle. In accordance with this invention, this control is so devised as to permit shifting the transmission to either high or low speed ratio at will, but to permit engagement of the front axle drive only when the rear end transmission is in low speed ratio. My invention is particularly useful in connection with a six-wheeled vehicle having all wheels power driven. Such a vehicle is generally termed a 6 x 6. In this application, I prefer to employ a four wheel two speed rear bogie of the type generally disclosed in the aforesaid Thornton patents. Although particularly useful in combination with this type of rear end drive, my invention is also applicable to a four wheeled vehicle with four wheel drive, which is usually termed a 4 x 4.

In describing the invention in detail, reference will be made to the accompanying drawings in which an embodiment thereof has been illustrated. In the drawings:

Fig. 1 is a simplified plan view of the chassis of a 6 x 6 vehicle embodying the invention;

Figs. 2a and 2b together comprise an elevation on an enlarged scale of the chassis shown in Fig. 1;

Fig. 3 is an enlarged plan view of the shift control of the vehicle;

Fig. 4 is an elevation showing the shift control and the power divider of the vehicle;

Fig. 5 is a view similar to Fig. 4 showing the shift control of the rear end drive transmission; and Fig. 6 is an enlarged sectional plan view of the gearless differential employed on the front axle of the vehicle.

Figure 2A:
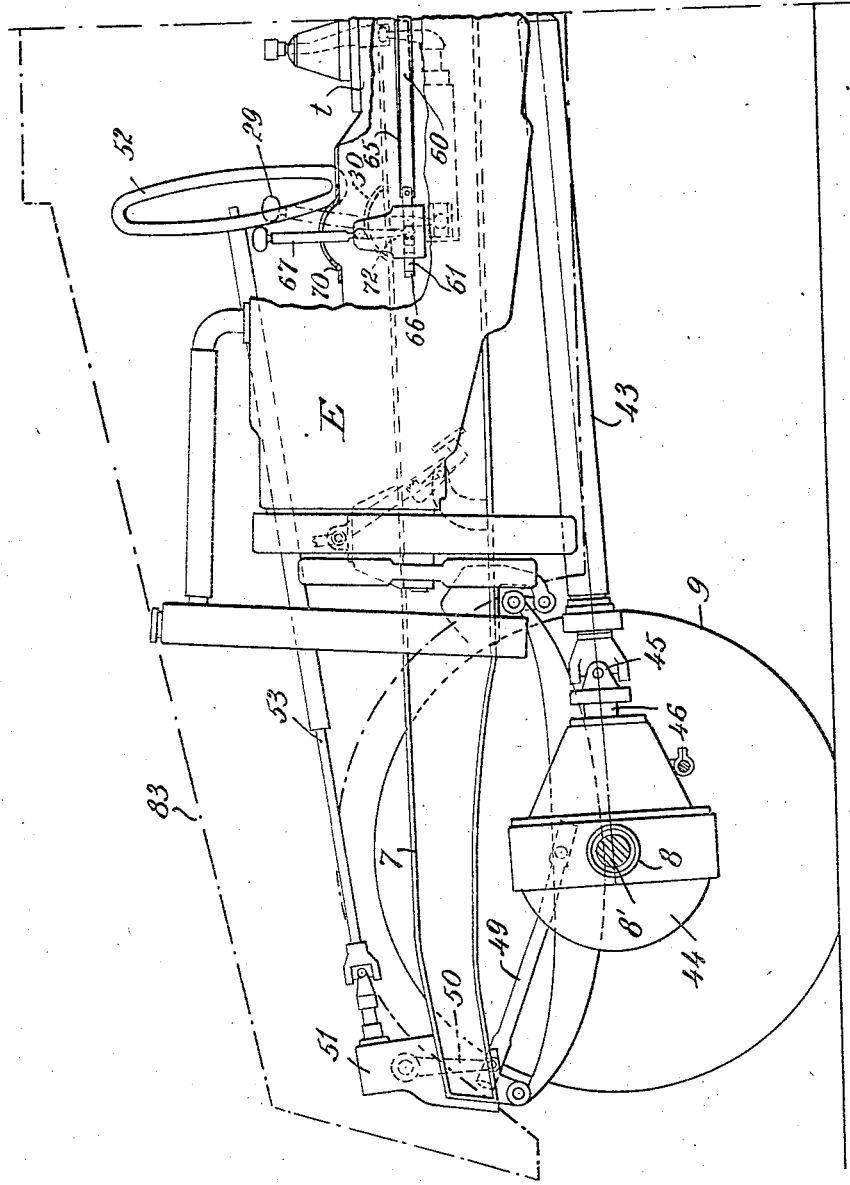

Referring to the drawings and particularly to Figs. 1, 2a and 2b, the vehicle chassis shown includes a frame 7 having a suitably sprung front driving axle 8 having dirigible driven front wheels 9 and a four wheel bogie rear drive generally indicated by the letter B.

The driving joints 9a through which the dirigible front wheels 9 are driven from the axle 8 are of known construction, and may include the features disclosed in United States patent to Herrington, No. 2,107,073. The front axle differential 44 is preferably of the gearless or self-locking type as hereinafter explained. Suitable steering mechanism is provided and as shown includes a cross-link or stretcher rod 47 connecting the trunnioned wheel shafts and an arm 48 fixed to one wheel shaft and connected by a steering rod 49 to the arm 50 of the steering gear 51 which is operated by the steering wheel 52 through a shaft 53.

The rear drive bogie B illustrated is of the type shown and described in detail in United States Patents Nos. 1,897,153 and 2,047,088 referred to above, and its construction will not be described in detail herein. In general, it comprises a central two speed transmission T fixed to the frame 7, the output of which is connected through two short shafts 10 and 11 to the two axles 12 and 13 carrying the respective wheel pairs 14 and 15. The axles 12 and 13 are carried by the opposite ends of springs 16 and 17 and the centers of the springs are carried by center transverse trunnions 18 and 19. The shafts 10 and 11 drive the respective axles 12 and 13 through differentials 20 and 21 which may be of the gearless or self-locking type. Suitable gearless differentials of this type are disclosed in the United States patent to Thornton, No. 2,231,968 and in the United States patents to Frederickson, Nos. 2,050,304 and 2,175,520.

As best shown in Fig. 5, the transmission T includes a power input shaft 22 extending substantially longitudinally of the vehicle frame and rotatably carrying two gears 23 and 24 of different size within the transmission case 25. A clutch member 26 slideably splined to the input shaft 22 between the gears 23 and 24 is selectively engageable with either gear and may be disposed out of engagement with both whereby the transmission may be engaged in high or low speed ratio or placed in neutral or disengaged condition. A double idler gear 27 transmits power from either of the gears 23 or 24 to the ring gear 28 of a differential D which may be of the gearless or self-locking type and may have the construction disclosed in the patents referred to above. The output shafts of the differential D are connected through universal joints of known construction to the shafts 10 and 11 described above.

An engine E is mounted in the frame 7 toward the front end thereof by a suitable known means, not shown. The engine illustrated is an internal combustion engine of known construction and is provided with the usual multispeed transmission and clutch unit t at its rearward end. A conventional shift lever 29 riding in a gate 30 is provided to control the transmission t and is suitably connected thereto.

For a purpose hereinafter described, the output shaft 31 of the engine E and transmission t is disposed at a slight angle to the horizontal, say about 3°, the rearward end of this shaft being lower than its forward end. A single speed power divider P for taking off front wheel driving power is suitably fixed to the frame 7 rearwardly of the engine E. In general, the divider P comprises a main drive shaft 32 journaled in a housing 33 and carrying a sprocket 34 fixed thereto (see Fig. 4). The sprocket 34 is connected by a drive chain 35 to a sprocket 36 rotatably carried by a shaft 37 journaled in the housing 33. A clutch element 38 slideably splined on the shaft 37 is movable to engage and disengage the driving connection between the sprocket 36 and the shaft 37 in a known manner. The main shaft 32 of the power divider P extends longitudinally of the vehicle chassis but is inclined forwardly at an angle equal and opposite to the angle of inclination of the output shaft 31 of the engine E and transmission t.

The sprocket 34 of the power divider P is smaller than the sprocket 36 thereof, whereby the power divider acts as a speed reducing transmission. The speed ratio of the power divider is such that it drives the front wheels 9 of the vehicle at the same speed that the rear wheels 14 and 15 are driven when the transmission T is engaged in low speed ratio.

A horizontal shaft 39 connects the output shaft 31 of the engine unit to the front end of the main power divider shaft 32, through universal joint 40 of known construction. The rear end of the power divider shaft 32 is connected by a shaft 41 to the input shaft 22 of the rear end drive transmission T and universal joints 42 of known construction are provided at each end of the shaft 41. As best shown in Fig. 2b, the shaft 41 is horizontal whereas the shaft 22 is inclined rearwardly at an angle substantially equal and opposite to the angle of inclination of the power divider shaft 32.

The power output shaft 37 of the power divider P is connected by a shaft 43 to the front axle differential 44. The differential 44, shown in section in Fig. 6, is of the gearless or self-locking type disclosed in the Thornton Patent No. 2,231,968 referred to above. Since the construction of such differentials is well known to those skilled in this art, its details will not be described herein. It is sufficient to explain that when the vehicle is traveling in a straight line, rotation of the ring gear 80 by the pinion 81 on the shaft 46 turns the axle shafts 8' and 8" at the same speed. In rounding a turn, the outer axle shaft rotates at a higher speed than the inner axle shaft and is disengaged from the ring gear 80 and therefore loses driving power, all of which is applied to the inner axle shaft.

Universal joints 45 are provided to the opposite ends of the shaft 43. The angular arrangement of the shafts 37, 43 and 46 is such that the power divider output shaft 37 and the input shaft 46 of the front axle differential 44 are parallel at all times and are substantially aligned and lie in the plane through the axis of the shaft 43 when the front axle is in the normal position shown, whereby the action of the universal joints 45 is reduced to the minimum and the variable velocities of these joints cancel out. This insures the transmission of driving power at uniform velocity from the power divider P to the front drive axle 8. The arrangement of the driving connections between the engine E and the rear end drive transmission T similarly insures a drive of uniform velocity. The engine output shaft 31 and power divider shaft 32 are disposed at equal and opposite angles of inclination with respect to the horizontal connecting shaft 39 whereby variable velocities in the universal joints 40 cancel out. Similarly, the power divider shaft 32 and the transmission input shaft 22 lie at equal and opposite angles to the connecting shaft 41 thereby insuring cancellation of variable velocities in the universal joints 42. This cancellation of variable velocities not only prevents useless dissipation of power in the drive mechanism but reduces vibration and wear in the parts thereof.

The shift control for the rear drive bogie B is so interlocked with the front wheel drive clutch that whereas the rear drive transmission T may be selectively engaged in high or low speed ratio at will, the front wheel drive can be engaged only when the rear transmission T is in low speed ratio, and must be disengaged before that transmission can be shifted to neutral or to high speed ratio. Various means may be provided for accomplishing this result. In the illustrated embodiment, the clutch member 26 of the transmission T is moved by a shifter rod 55. As shown in Figs. 3 and 5, this rod 55 is connected by a link 56, an arm 57, a cross shaft 58, an arm 59 and a link 60 to a slideably supported shifter bar 61. The clutch member 38 of the power divider T is operated by a shifter rod 62 which moves the element 38 rearwardly to engage the front wheel drive end forwardly to disengage it. The rod 62 is connected by a pivoted horizontal cross lever 63, a pivoted vertical lever 64 and a link 65 to a shifter bar 66 slideably supported adjacent and parallel to the bar 61 (see Figs. 1, 3 and 4).

A shift lever 67 is mounted in a ball pivot 68 in a suitable housing 69 and rides in a gate 70 fixed above the pivot 68. The shifter bars 61 and 66 are slideably mounted in the base of the housing 69 on either side of a stationary central spacer 71 (Figs. 3 and 4). The lower end of the shifter lever 67 terminates in a ball 72 engageably with a notch 73 in the shifter bar 61 or a notch 74 in the shifter bar 66 (Fig. 3).

With the parts in the positions shown in Figs. 3, 4 and 5, the transmission T is in neutral and the power divider clutch 38 is in the disengaged position. The lever 67 is in the outer slot 75 of the gate 70 and consequently the ball 72 engages the notch 73 in the shifter bar 61 for the transmission T. If the lever 67 is now moved forward in the slot 75 to the position marked "High" in Fig. 3, the shifter bar 61 is moved rearwardly, thus engaging the transmission T in high speed ratio. If the lever 67 is moved rearwardly to the rear end of the slot 75, the shifter bar 61 is moved forward and the transmission T engaged in low speed ratio. A stop 76 on the side of the slot 75 prevents sudden shifting from high to low and insures a pause in neutral to permit gear synchronization by "double clutching" thereby saving wear on the gears. A bevelled stop 77 on the opposite side of the slot 75 similarly insures a pause in shifting from low to high.

With the rear drive transmission T in low speed ratio, the lever 67 may be moved transversely in the cross-slot 78 of the gate 70, thereby inserting the ball 73 in the notch 74 of the shifter bar 66. If the lever 67 is then moved forward in the slot 79 to the position marked "F. W. D." in Fig. 3, the shifter bar 66 is moved rearwardly, thereby engaging the clutch element 38 and connecting the front wheel drive.

With the arrangement described, a vehicle may be operated in either high or low speed ratio with the front wheel drive disengaged. With the transmission T in high speed ratio, the vehicle can be operated on surfaced roads at very high speeds at which front wheel drive through a self-locking differential would make steering difficult and dangerous for the reasons explained above. Operation with front wheel drive at such speeds would also cause excessive wear, particularly in the dirigible front wheel drive joints. With the front wheel drive connection disengaged in accordance with the combination of the present invention, wear on the front wheel drive connections is reduced to a minimum since no power is transmitted during high speed operation. When negotiating rough or slippery roads, steep grades, mud, sand or snow, the variable speed transmission T is shifted to low speed ratio and the front wheel drive is engaged. The vehicle can now exert maximum positive tractive effort on all wheels and can negotiate rough, slippery or boggy terrain at relatively low speeds. At such speeds, the gearless or self-locking front drive differential does not materially interfere with steering, and the added traction it affords permits operation of a lighter vehicle with maximum flotation over slippery or sandy ground that cannot be negotiated with previously known vehicles capable of operating satisfactorily at high speeds.

Due to the fact that the front wheel drive is engaged only after the rear drive has been connected in low ratio, and that under such conditions the front and rear drive speed ratios are the same, the front wheel drive can be engaged or disengaged with but slight manual pressure on the shift lever 67. The shift control arrangement compels engagement of the rear drive in low ratio before the front wheel drive can be engaged and so prevents operation of the vehicle with front wheel drive alone.

By the use of the combination of the present invention, the engine E can be placed considerably to the rear of the front axle 8 and dropped below the level of the front axle housing. As illustrated in Figs. 2a and 2b, wherein the outer surface of a vehicle body is indicated by the broken line 83, this permits a low streamlined front and profile. It also permits the use of heavy front end armor without overloading the front axle.

The rearward placement of the engine is accomplished without increasing the wheelbase of the chassis since with the described bogie rear end drive, or similar drives employing a sprung rear transmission, the drive shaft between the engine and the rear transmission is fixed with respect to the frame and can be shortened as desired without increasing the wear or power loss in its universal joint.

The complete combination of the invention results in a lighter 6 x 6 vehicle having maximum traction; an extremely short and readily alterable wheelbase capable of carrying or towing heavy loads; negotiating rough, slippery and boggy terrain and steep grades at low speeds and surfaced roads at extremely high speeds without excess power or weight. The vehicle of my combination is extremely well adapted to military use in combat zones since because of the drive construction the engine can be placed to accommodate a low streamlined front profile and heavy front end armor with the driver seated outside of and below the top of the frame and substantially mid-way between the front and rear axles. Operation of the vehicle over rough bumpy roads is surprisingly smooth and the steering and shifting operations are easily performed without undue fatigue of the operator.

I claim:

1. In a motor vehicle having dirigible front driving wheels and rear driving wheels, in combination, an engine, a driving connection between said engine and the rear driving wheels including a variable speed transmission having at least two speed ratios, a disengageable driving connection between said first named driving connection and the front driving wheels including speed reduction mechanism having a single speed ratio the same as the lower speed ratio of said transmission, and means for engaging said front wheel driving connection only when said transmission is set at the lower speed ratio.

2. In a motor vehicle having a front driving axle carrying dirigible front road engaging wheels, at least one rear driving axle carrying road engaging wheels, and an engine, in combination, a transmission having at least two speed ratios disposed at a point spaced from said engine, means for connecting the output of said transmission to said rear driving axle, a drive shaft connected between said engine and the input of said transmission, a disengageable driving connection connected to said drive shaft between said engine and the input of said transmission and to said front driving axle, and acting when engaged to drive said front road engaging wheels at the speed said rear road engaging wheels are driven with said transmission in low speed ratio, means for selectively engaging said transmission in either low or high speed ratio with said front drive connection disengaged, and means for engaging said front drive connection only when said transmission is engaged in low speed ratio.

3. In a motor vehicle having a front driving axle carrying dirigible front road engaging wheels, at leas one rear driving axle carrying road engaging wheels, and an engine, in combination, a self-locking differential on said front driving axle, a transmission having at least two speed ratios disposed at a point spaced from said engine, means for connecting the output of said transmission to said rear driving axle, a drive shaft connected between said engine and the input of said transmission, a disengageable driving connection connected to said drive shaft between said engine and the input of said transmission and to said front driving axle differential, and acting when engaged to drive said front road engaging wheels at the speed said rear road engaging wheels are driven with said transmission in low speed ratio, means for selectively engaging said transmission in either low or high speed ratio with said front driving connection disengaged, and means for engaging said front driving connection only when said transmission is engaged in low speed ratio.

4. In a motor vehicle, the combination of a frame provided with a spring mounted front driving axle, at least one spring mounted rear driving axle and dirigible road engaging driving wheels on said front driving axle, an engine having a power output shaft extending substantially longitudinally of the vehicle frame, a variable speed transmission having at least two speed ratios and having its output connected to said rear driving axle, an input shaft for said variable speed transmission substantially aligned with said power output shaft of said engine, a drive shaft connected between said engine power output shaft and said transmission input shaft, a disengageable power divider connected to said drive shaft and to said front driving axle and having a speed ratio equal to the low speed ratio of said transmission, means for selectively engaging said transmission in high or low speed ratio with said power divider disengaged and means for engaging said power divider only after said transmission is engaged in low speed ratio.

5. In a motor vehicle, in combination, a frame, a driving axle carrying dirigible road engaging wheels adjacent the front end of said frame, a variable speed transmission having a high and a low speed ratio fixed to the frame adjacent its rearward end, at least one rear driving axle connected to the frame through springs and driven from said transmission, an engine fixed to the frame rearwardly of said front axle, a main shaft connecting said engine to said variable speed transmission, a drive shaft connected to said front driving axle and having a portion extending substantially parallel to said main drive shaft, a disengageable driving connection between said main drive shaft and said substantially parallel portion of said front axle drive shaft, control means for selectively varying the speed ratio of said transmission, and means for engaging said front axle driving connection only after said transmission has been engaged in low speed ratio.

6. In a motor vehicle, in combination, a frame, a driving axle carrying dirigible road engaging wheels adjacent the front end of said frame, a variable speed transmission having a high and a low speed ratio fixed to the frame adjacent its rearward end, at least one rear driving axle connected to the frame through springs and driven from said transmission, a self-locking differential on said front driving axle, an engine fixed to the frame rearwardly of said front axle, a main shaft connecting said engine to said variable speed transmission, a drive shaft connected to said front driving axle differential and having a portion extending substantially parallel to said main drive shaft, a disengageable driving connection between said main drive shaft and said substantially parallel portion of said front axle drive shaft, control means for selectively varying the speed ratio of said transmission and means for engaging said front axle driving connection only after said transmission has been engaged in low speed ratio.

7. In a motor vehicle, in combination, a frame, a driving axle spring connected to said frame adjacent the front end thereof, dirigible driving wheels on said front driving axle, a four wheel bogie rear drive comprising spaced driving axles spring connected to the frame and a variable speed transmission having two speed ratios fixed to the frame between such axles and connected to drive the same, an engine fixed to said frame rearwardly of said front axle, a main drive shaft connected between said engine and said transmission, a front end drive shaft connected to said front end driving axle and extending adjacent said main drive shaft, a disengageable driving connection between said drive shafts having a speed ratio equal to the low speed ratio of said transmission, means for changing the speed ratio of said transmission and means for engaging said driving connection between said drive shafts only after said transmission is engaged in low speed ratio.

8. In a motor vehicle, in combination, a frame, a driving axle spring connected to said frame adjacent the front end thereof, dirigible driving wheels on said front driving axle, a self-locking differential on said front driving axle, a four wheel bogie rear drive comprising spaced driving axles spring connected to the frame and a variable speed transmission having two speed ratios fixed to the frame between such axles and connected to drive the same, an engine fixed to said frame rearwardly of said front axle, a main drive shaft connected between said engine and said transmission, a front end drive shaft connected to said front end driving axle differential and extending adjacent said main drive shaft, a disengageable driving connection between said drive shafts having a speed ratio equal to the low speed ratio of said transmission, means for changing the speed ratio of said transmission and means for engaging said driving connection between said driving shafts only after said transmission is engaged in low speed ratio.

9. In a motor vehicle, in combination, a frame, a variable speed transmission having a high and a low speed ratio fixed to said frame adjacent the rear end thereof, a power input shaft on said transmission extending longitudinally of said frame and inclined rearwardly at an angle to the horizontal, at least one rear driving axle spring connected to said frame adjacent said transmission, a driving connection between said transmission and said rear driving axle, an engine having a power output shaft extending longitudinally of said frame and inclined rearwardly at an angle to the horizontal equal to the angle of inclination of said transmission input shaft, and a driving shaft connection extending longitudinally of said frame between said engine power output shaft and said transmission input shaft including a first horizontal shaft section connected to said engine power output shaft through a universal joint, a power divider shaft connected to said first horizontal shaft section through a universal joint and inclined forwardly at an angle to the horizontal equal and opposite to the angle of inclination of said engine power output shaft, and a second horizontal shaft section connected through universal joints to said power divider shaft and said transmission power input shaft.

10. In a motor vehicle, in combination, a frame, a driving axle spring connected to said frame adjacent its front end, dirigible road engaging driving wheels connected to said front driving axle, a differential on said front axle having a power input shaft, a variable speed transmission having a high and a low speed ratio fixed to said frame adjacent the rear end thereof, a power input shaft on said transmission extending longitudinally of said frame and inclined rearwardly at an angle to the horizontal, at least one rear driving axle spring connected to said frame adjacent said transmission, a driving connection between said transmission and said rear driving axle, an engine having a power output shaft extending longitudinally of said frame and inclined rearwardly at an angle to the horizontal equal to the angle of inclination of said transmission input shaft, a driving shaft connection extending longitudinally of said frame between said engine power output shaft and said transmission power input shaft including a first horizontal shaft section connected to said engine power output shaft through a universal joint, a first power divider shaft connected to said first horizontal shaft section through a universal joint and inclined forwardly at an angle to the horizontal equal and opposite to the angle of inclination of said engine power output shaft and a second horizontal shaft section connected through universal joints to said power divider shaft and said transmission power input shaft, a second power divider shaft disposed parallel to and spaced from said first power divider shaft and parallel to said front axle differential power input shaft, a disengageable driving connection between said power divider shafts having a speed ratio equal to one of the speed ratios of said transmission, a front end drive shaft connected through universal joints between said second power divider shaft and said front axle differential power input shaft, means for changing the speed ratio of said transmission, and means for engaging and disengaging said driving connection of said power divider.

11. In a motor vehicle, in combination, a frame, a driving axle spring connected to said frame adjacent its front end, dirigible road engaging driving wheels connected to said front driving axle, a self-locking differential on said front axle having a power input shaft, a variable speed transmission having a high and a low speed ratio fixed to said frame adjacent the rear end thereof, a power input shaft on said transmission extending longitudinally of said frame and inclined rearwardly at an angle to the horizontal, at least one rear driving axle spring connected to said frame adjacent said transmission, a driving connection between said transmission and said rear driving axle, an engine having a power output shaft extending longitudinally of said frame and inclined rearwardly at an angle to the horizontal equal to the angle of inclination of said transmission input shaft, a driving shaft connection extending longitudinally of said frame between said engine power output shaft and said transmission power input shaft including a first horizontal shaft section connected to said engine power output shaft through a universal joint, a first power divider shaft connected to said first horizontal shaft section through a universal joint and inclined forwardly at an angle to the horizontal equal and opposite to the angle of inclination of said engine power output shaft and a second horizontal shaft section connected through universal joints to said first power divider shaft and said transmission power input shaft, a second power divider shaft disposed parallel to and spaced from said first power divider shaft and parallel to said front axle differential power input shaft, a disengageable driving connection between said power divider shafts having a speed ratio equal to the low speed ratio of said transmission, a front end drive shaft connected through universal joints between said second power divider shaft and said front axle differential power input shaft, means for changing the speed ratio of said transmission and means for engaging said driving connection of said power divider only after said transmission is engaged in low speed ratio.

12. In a motor vehicle having an engine, a front driving axle and at least one rear driving axle, in combination, a transmission connected between the engine and the rear driving axle and having a low speed ratio position, a neutral position, and a high speed ratio position, a disengageable driving connection between said engine and said front driving axle, a transmission shifter bar connected to said transmission for selectively shifting its positions, a front drive shifter bar adjacent said transmission shifter bar for engaging and disengaging said front axle driving connection, a shifter lever movable to selectively engage said respective shifter bars and movable to separately shift either one of said bars, means for maintaining said lever in engagement with said transmission shifter bar when said transmission is in high speed ratio position and neutral position, and means for permitting engagement of said lever with said front drive shifter bar only after said lever has moved said transmission shifter bar to the low speed ratio position.

13. In a motor vehicle having an engine, a front driving axle and at least one driving axle, in combination, a transmission connected between the engine and the rear driving axle and having a low speed ratio position, a neutral position, and a high speed ratio position, a disengageable driving connection between said engine and said front driving axle, a transmission shifter bar connected to said transmission for selectively shifting its positions, a front drive shifter bar adjacent said transmission shifter bar for engaging and disengaging said front axle driving connection, a shifter lever movable laterally to selectively engage said respective shifter bars and movable longitudinally to separately shift either one of said bars, means for maintaining said lever in a lateral position such that it engages said transmission bar when said transmission is in high speed ratio position and neutral position and for permitting lateral movement of said shift lever into engagement with said front drive shifter bar only when said lever has moved said transmission shifter bar to the low speed ratio position.

14. In a motor vehicle, in combination, a frame, a front driving axle carrying dirigible front driving wheels spring connected to said frame, a transmission fixed to said frame adjacent the rear end thereof, at least one rear driving axle spring connected to said frame adjacent said transmission, a driving connection between said transmission and said rear driving axle, an engine having a power output shaft extending longitudinally of said frame, a main drive shaft extending longitudinally of said frame and connected between said engine power output shaft and said transmission, said main drive shaft including a forwardly inclined portion, a front wheel drive shaft connected to said front driving axle and having a portion parallel to and adjacent said forwardly inclined portion of said main drive shaft, sprockets on said parallel and adjacent shaft portions, and a chain connecting said sprockets.

15. In a motor vehicle, in combination, a frame, a front driving axle carrying dirigible front driving wheels spring connected to said frame, a self-locking differential on said front driving axle, a variable speed transmission having a high speed ratio and a low speed ratio fixed to said frame adjacent the rear end thereof, at least one rear driving axle spring connected to said frame adjacent said transmission, a driving connection between said transmission and said rear driving axle, an engine fixed to said frame and having a power output shaft extending longitudinally of said frame, a main drive shaft extending longitudinally of said frame and connected between said engine power output shaft and said transmission, said main drive shaft including a forwardly inclined portion, a front wheel drive shaft connected to said front driving axle differential and having a portion parallel to and adjacent said forwardly inclined portion of said main drive shaft, sprockets on said parallel and adjacent shaft portions, means for disengaging one of said sprockets from its shaft to disengage the front axle drive, means for selectively engaging said transmission in high or low speed ratio and means for engaging said disengageable sprocket to its shaft only after said transmission is engaged in low speed ratio.

HALSEY V. WELLES.